United States Patent
Konuma et al.

(10) Patent No.: US 6,236,444 B1
(45) Date of Patent: *May 22, 2001

(54) LIQUID CRYSTAL DEVICE WITH DRIVE CIRCUITS ON BOTH SUBSTRATES

(75) Inventors: Toshimitsu Konuma; Takahiro Tsuji; Kouji Moriya, all of Kanagawa (JP)

(73) Assignee: Semiconductor Energy Laboratory Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,112

(22) Filed: Aug. 13, 1997

Related U.S. Application Data

(62) Division of application No. 08/698,204, filed on Aug. 14, 1996, which is a continuation of application No. 08/301,774, filed on Sep. 7, 1994, now abandoned.

(30) Foreign Application Priority Data

Sep. 20, 1993 (JP) .................................... 5-256571

(51) Int. Cl.⁷ .................................................. G02F 1/1345
(52) U.S. Cl. ........................................... 349/151; 349/153
(58) Field of Search .................................. 349/153, 158, 349/187, 151

(56) References Cited

U.S. PATENT DOCUMENTS

| | | | | |
|---|---|---|---|---|
| 3,600,061 | * | 8/1971 | Heilmeier et al. | 349/158 |
| 4,362,771 | * | 12/1982 | Umeda et al. | 349/157 |
| 4,394,067 | * | 7/1983 | Spruijt et al. | 359/88 |
| 4,688,074 | * | 8/1987 | Iinuma | 349/151 |

(List continued on next page.)

FOREIGN PATENT DOCUMENTS

| | | | | |
|---|---|---|---|---|
| 62-109026 | * | 5/1987 | (JP) . | |
| 62-240934 | | 10/1987 | (JP) . | |
| 62-251723 | * | 11/1987 | (JP) . | |
| 64-49022 | * | 2/1989 | (JP) . | |
| 1-68725 | | 3/1989 | (JP) . | |
| 4-78819 | * | 3/1992 | (JP) | 359/82 |
| 4-116623 | * | 4/1992 | (JP) | 359/82 |
| 4-133029 | | 5/1992 | (JP) . | |
| 4-355433 | | 12/1992 | (JP) . | |
| 5-66413 | | 3/1993 | (JP) . | |
| 5-066413 | * | 3/1993 | (JP) . | |
| 5-203977 | | 8/1993 | (JP) . | |
| 6-186579 | | 7/1994 | (JP) . | |
| 6-186580 | | 7/1994 | (JP) . | |

OTHER PUBLICATIONS

English Translation of Japanese Patent Laid–Open No. 62–251723, published Nov. 2, 1987.*
English Translation of Japanese Patent Laid–Open No. 4–78819, published Mar. 12, 1992.*
English Translation of Japanese Patent Laid–Open No. 64–49022, published Feb. 23, 1989.*

(List continued on next page.)

Primary Examiner—Kenneth Parker
(74) Attorney, Agent, or Firm—Nixon Peabody LLP; Eric J. Robinson

(57) ABSTRACT

A highly reliable liquid crystal display device in which the drive circuit region is protected, which comprises a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate.

12 Claims, 6 Drawing Sheets

U.S. PATENT DOCUMENTS

| | | |
|---|---|---|
| 4,826,297 * | 5/1989 | Kubo et al. .............................. 359/82 |
| 5,076,667 | 12/1991 | Stewart et al. . |
| 5,130,832 * | 7/1992 | Kawaguchi et al. .................... 359/87 |
| 5,130,833 | 7/1992 | Mase . |
| 5,148,301 * | 9/1992 | Sawatsubashi et al. . |
| 5,200,847 | 4/1993 | Mawatari et al. . |
| 5,247,375 * | 9/1993 | Mochizuki et al. ................. 349/151 |
| 5,278,682 | 1/1994 | Niki . |
| 5,278,685 * | 1/1994 | Iwamoto et al. ..................... 349/151 |
| 5,436,744 * | 7/1995 | Arledge et al. ........................ 359/82 |
| 5,442,470 * | 8/1995 | Hashimoto ............................. 359/83 |
| 5,460,983 * | 10/1995 | Hodes et al. ........................... 437/24 |
| 5,517,344 * | 5/1996 | Hu et al. .............................. 349/153 |
| 5,710,612 | 1/1998 | Mase . |

OTHER PUBLICATIONS

English Translation of Japanese Patent Laid–Open No. 4–116623, published Apr. 17, 1992.*

"'93 The Latest Liquid Crystal Process Techniques", p. 272, published Oct. 1, 1992 including English Translation thereof.*

* cited by examiner

LIQUID CRYSTAL DEVICE WITH DRIVE CIRCUITS ON BOTH SUBSTRATES

This a Divisional application of Ser. No. 08/698,204, filed Aug. 14, 1996, which itself is a Continuation of Ser. No. 08/301,774, filed Sep. 7, 1994, now abandoned.

BACKGROUND OF THE INVENTION

1. Industrial Field of the Invention

The present invention relates to a liquid crystal display device comprising both a display region and a drive circuit region for a drive circuit which controls the display formed on a single substrate. The liquid crystal display device according to the present invention comprises another substrate opposed to the portion of the drive circuit in order to prevent failure from occurring on the drive circuit due to external pressure or shock.

2. Prior Art

Conventionally known liquid crystal display devices include active matrix-addressed (active matrix) liquid crystal display device comprising active elements such as a thin film transistor (referred to simply hereinafter as a "TFT") on each of the pixels. Among them, there is also known an active matrix display device of a monolithic structure comprising drive circuits, which controls the signal applied to each of the pixels, provided integrated to the substrate having thereon the active elements connected to each of the pixels. The drive circuit is formed simultaneously with the fabrication of an amorphous silicon TFT for the display portion constituting the matrix, and then crystallized by selectively irradiating laser and the like to the drive circuit portion alone. In this manner, the TFTs in the drive circuit were converted into crystalline silicon TFTs.

Referring to FIG. 1 which schematically shows a device of the type described above, it can be seen a substrate 2 opposing to a substrate 1 having thereon the drive circuit is extended to cover only a display region 5 comprising a liquid crystal material 3, and no measure is taken for the drive circuit portion 6 except for covering with a resin 7 or a like material.

However, in the construction of a liquid crystal display device of a conventional type, an external force toward the drive circuit portion may easily cause damage on the drive circuit.

SUMMARY OF THE INVENTION

In the light of the aforementioned circumstances, the present invention provides a highly reliable liquid crystal electro-optical display device comprising both a display region and a drive circuit region on a single substrate, in which the drive circuit region is protected against external forces and the like.

According to one embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate.

According to another embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, and at least a part of the periphery of said drive circuit region has thereon a sealing agent.

According to a still other embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, and a resin material is charged at least between said second substrate and said drive circuit region.

According to a yet other embodiment of the present invention, there is provided a liquid crystal electro-optical display device comprising a first substrate having thereon a display region and a drive circuit region comprising a drive circuit for controlling the display in said display region and a second substrate opposed to said first substrate, provided that said regions are partitioned by a sealing agent and that a liquid crystal material is incorporated between said first substrate and said second substrate opposed to the first one, wherein, said second substrate opposed to the first is extended to oppose both of said display region and said drive circuit region provided on the first substrate, at least a part of the periphery of said drive circuit region has thereon a sealing agent, and a resin material is charged at least between said second substrate and said drive circuit region.

According to further other embodiments of the present invention, there are provided liquid crystal display devices having the constitution enumerated above, wherein, a drive circuit is formed on the second substrate at a region opposed to the drive circuit region

DETAILED DESCRIPTION OF THE PRESENT INVENTION

As described in the foregoing, the present invention provides a liquid crystal display device comprising both a display region and a drive circuit region for a drive circuit which controls the display on a single substrate, provided that a substrate is opposed to the portion of the drive circuit in order to protect the drive circuit from external pressure and shock.

Furthermore, a resin material is charged between at least the drive circuit region and the substrate opposed thereto, thereby preventing the intrusion of moisture and the like. In this manner, a liquid crystal display device with further improved reliability can be realized.

Another drive circuit and the like can be further provided on the region of the second substrate opposed to the drive circuit region In this manner, a multilayer-structured device having a large drive circuit region can be implemented without increasing the substrate area.

The present invention is described in further detail below referring to the preferred embodiments according to the present invention. It should be understood, however, that the present invention is not to be construed as being limited to the examples below.

EXAMPLE 1

Figure 1A:
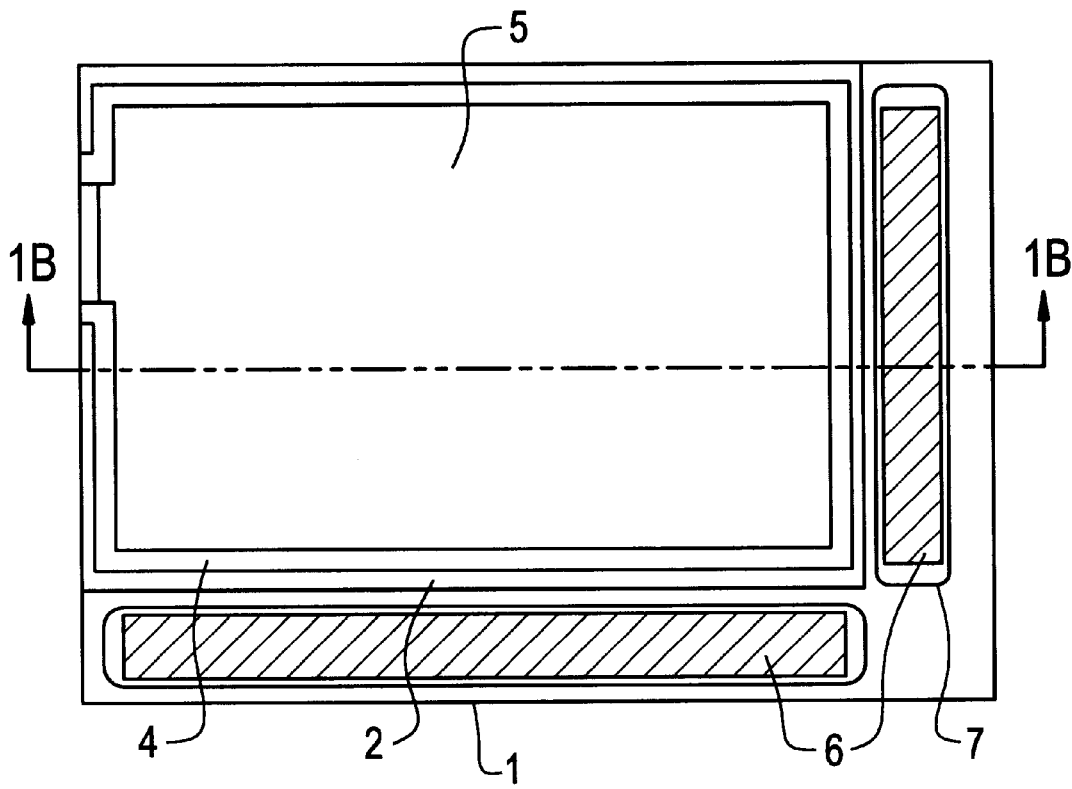
FIGS. 1a and 1b show a schematic view of a prior art liquid crystal display device.
Figure 1B:
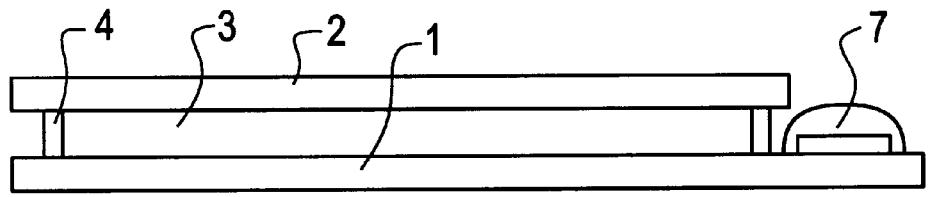
Figure 2A:
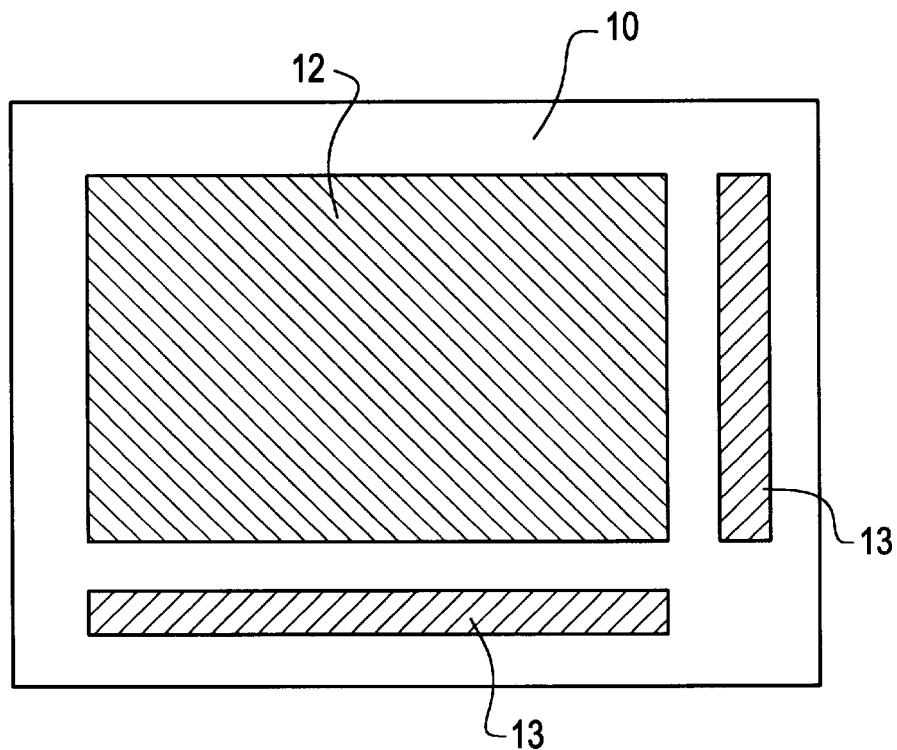
FIGS. 2 (A) and 2 (B) show a schematic view of a liquid crystal display device according to an embodiment of the present invention.
Figure 2B:
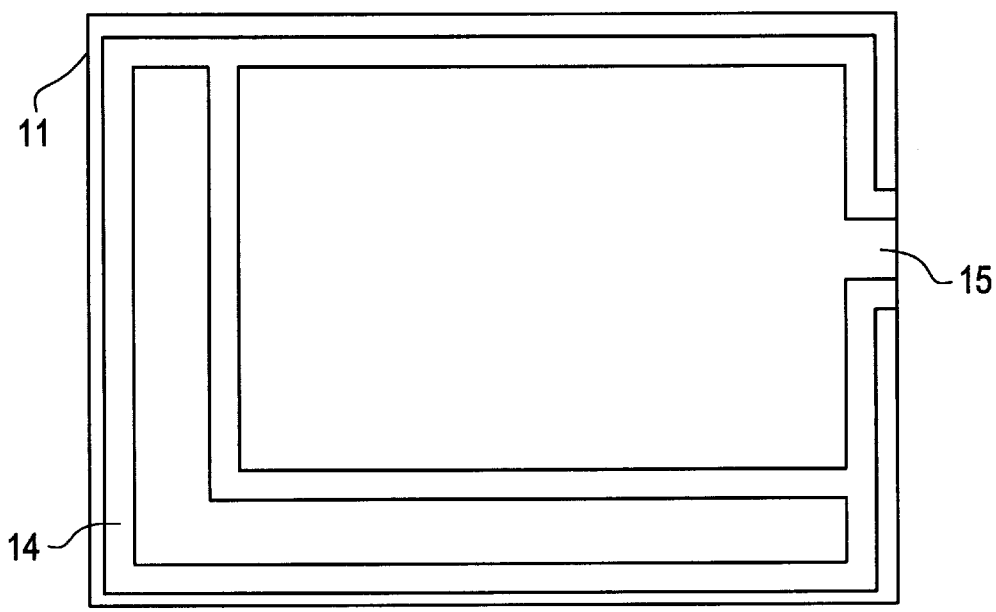

Referring to FIG. 2 (A), an amorphous silicon TFT was fabricated on a display region 12 of a Corning 7059 glass substrate 10. A crystalline silicon TFT was fabricated on a drive circuit region 13 by irradiating a laser beam to an amorphous silicon TFT for its crystallization. If necessary, the crystalline silicon TFT is covered with a passivation film made of, for example, SiN, $SiO_2$, PSG (phosphosilicate glass), BSG (borosilicate glass), or polyimide to construct a drive circuit. A pixel electrode and the like were formed thereafter on the display region 12 to implement a 640×480-matrix.

A sealing agent 14, more specifically, an ultraviolet-curable (referred to simply hereinafter as "UV-curable") resin in this case, was applied to a second substrate to be opposed to the first substrate above. This second substrate is capable of covering the drive circuit region of the facing first substrate, and comprises an ITO (indium tin oxide) facing electrode either on the display region alone or on the entire surface thereof. Referring to FIG. 2 (B), the sealing agent 14 was applied by screen printing in such a manner that each of the display region 12 and the drive circuit region 13 may be surrounded separately. An inlet 15 for injecting the liquid crystal material must be formed to the sealing agent provided for covering the display region. The entire periphery of drive circuit region need not be surrounded by the sealing agent. Otherwise, the display region alone can be surrounded by the sealing agent while leaving the drive circuit region uncovered by the sealing agent. Furthermore, the sealing agent may contain spacers.

Thus, the first substrate 10 and the second substrate 11 opposed to the first substrate were laminated after scattering spacers on the display region of the substrate 10, and an ultraviolet radiation was irradiated thereto for curing.

A liquid crystal material 16 was injected into inside of the display region after reducing the pressure of the laminated substrates, and sealed.

Figure 3A:
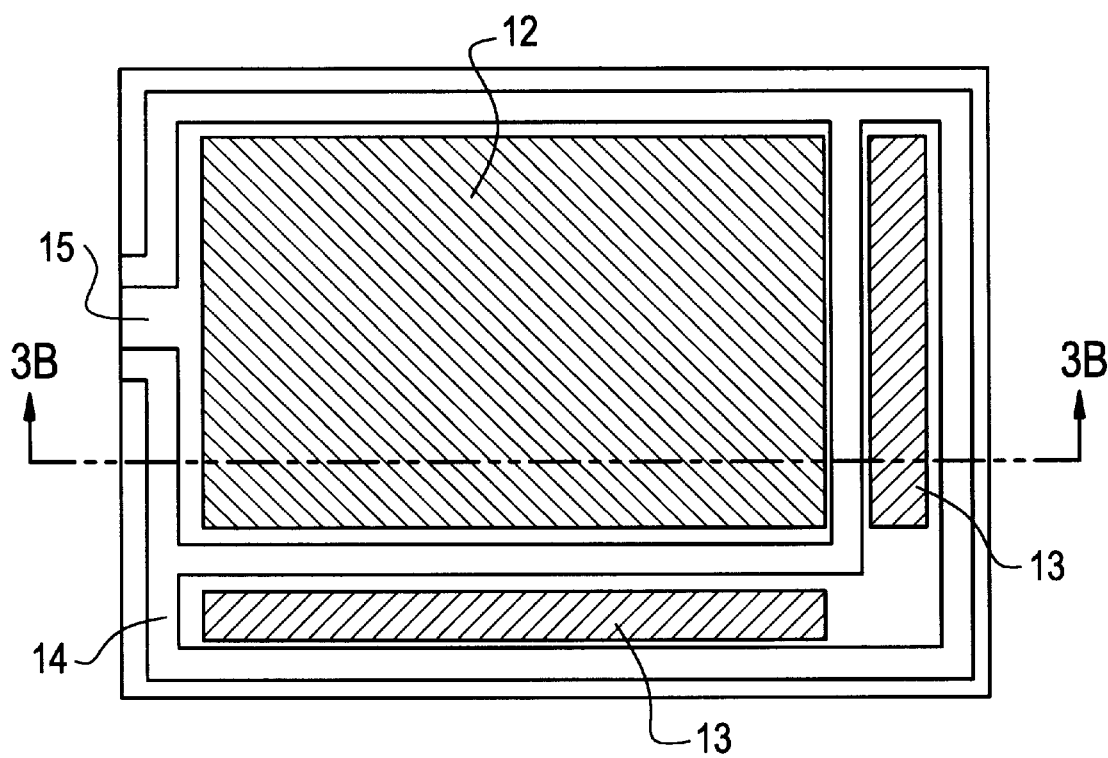
FIGS. 3a and 3b shows a schematic view of a liquid crystal display device according to another embodiment of the present invention.
Figure 3B:
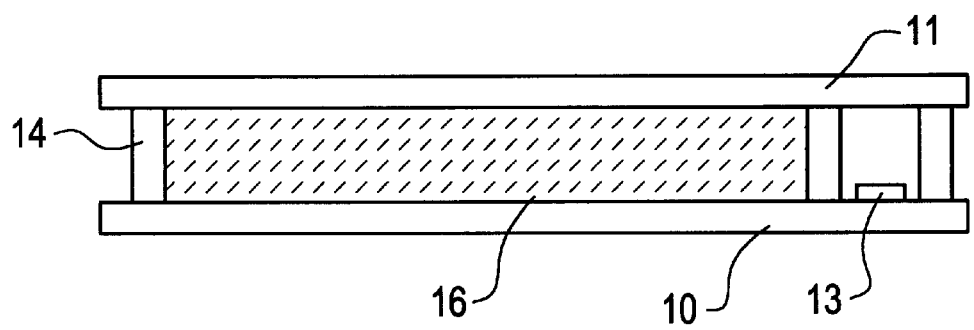

FIG. 3 illustrates a liquid crystal display device formed in such manner described above. The liquid crystal display device according to the present embodiment of the present invention was found to have far improved strength against external pressure as compared to a prior art device comprising both the display region and the drive circuit region on a single substrate but having its drive circuit covered by a resin and the like instead of providing a glass substrate opposed thereto. Thus, the drive circuit of the liquid crystal display device according to the present invention was found sufficiently protected against external force and therefore free from breakage. Moreover, the liquid crystal display device according to the present invention can be fabricated by an extremely simple process.

EXAMPLE 2

Figure 4A:
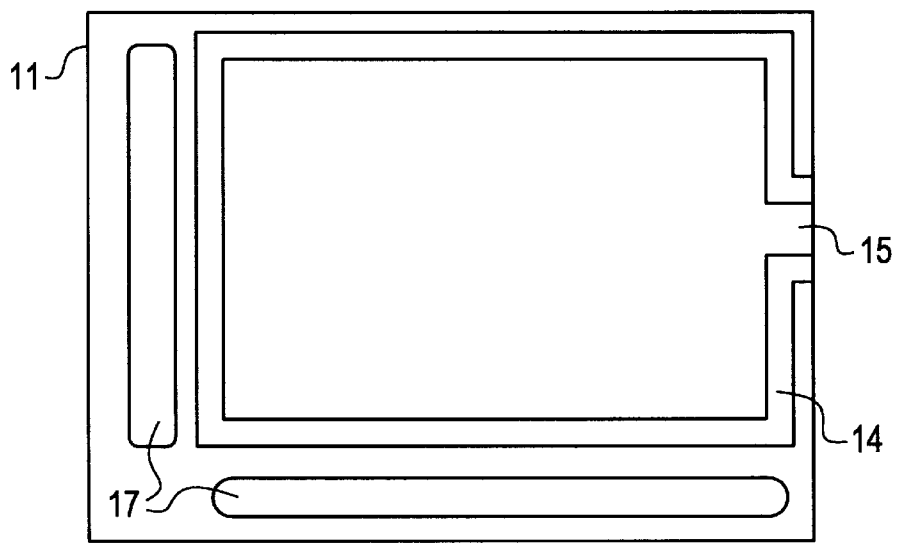
FIGS. 4a–4c show a schematic view of a liquid crystal display device according to a still other embodiment of the present invention.
Figure 4B:
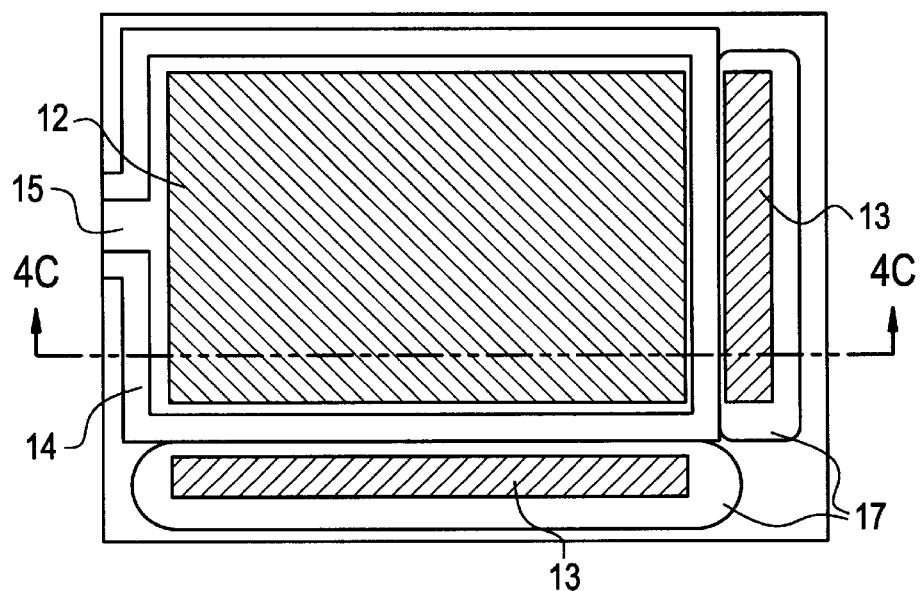
Figure 4C:
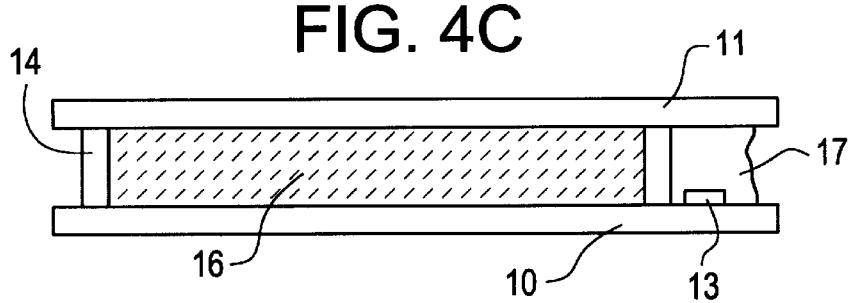

Referring to FIG. 4 (A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to cover the display region 12. The sealing agent may contain spacers. An inlet 15 for injecting a liquid crystal material must be provided in this step.

A resin material 17, such as a UV-curable resin or an epoxy resin, is provided to the portion to be opposed to the drive circuit region 13 by either screen printing or potting, so that the resin material can be charged sufficiently on at least the drive circuit region upon laminating the first substrate 10 and the second substrate 11 opposed thereto. The resin material may be the same as that for the sealing agent. The sealing agent and the resin may be applied not on the second substrate side, but on the first substrate side having thereon the display region and the drive circuit region.

After scattering spacers on the display region of the first substrate 10, the first substrate 10 was laminated with the second substrate 11. The sealing agent and the resin on the drive circuit region were cured thereafter.

The thus laminated substrates were placed under vacuum, and a liquid crystal material 16 was injected inside the display region and sealed.

Thus was implemented a liquid crystal display device as illustrated in FIG. 4 (B). Similar to the case in Example 1, the drive circuit in this liquid crystal display device was again found protected against external force, and the device itself had excellent resistance against intrusion of moisture. Accordingly, a highly reliable liquid crystal display device was implemented by a process according to an embodiment of the present invention.

EXAMPLE 3

Figure 5A:
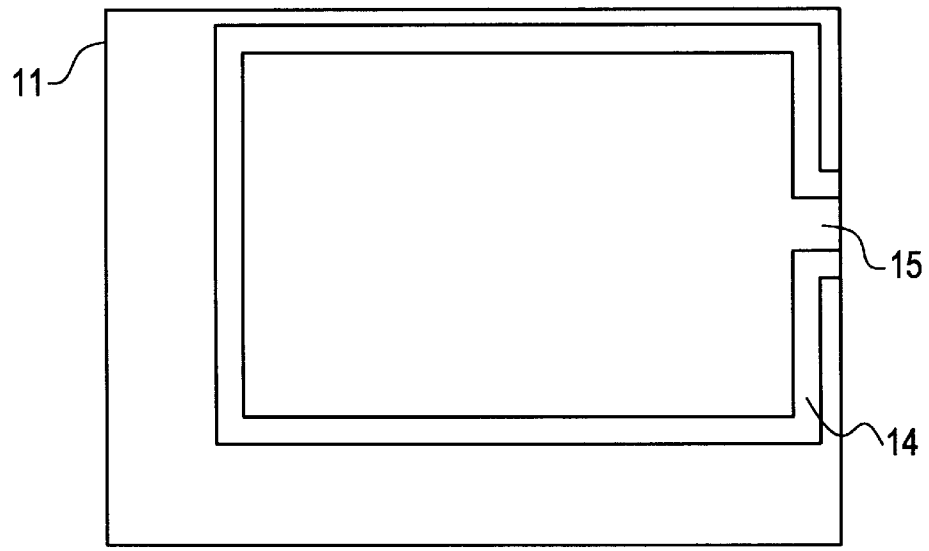
FIGS. 5a–5c show a schematic view of a liquid crystal display device according to a yet other embodiment of the present invention.
Figure 5B:
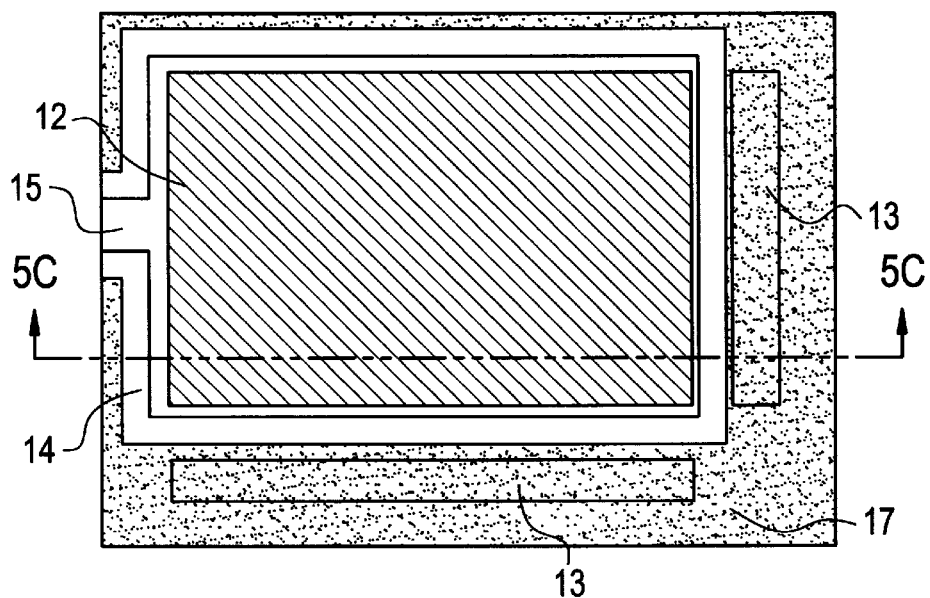
Figure 5C:
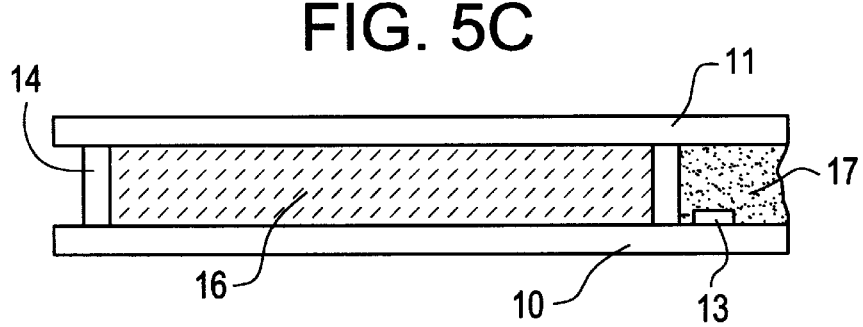

Referring to FIG. 5 (A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to cover the display region 12. The sealing agent may contain spacers. An inlet 15 for injecting a liquid crystal material must be provided in this step.

After scattering spacers on the display region of the first substrate 10, the first substrate 10 was laminated with the second substrate 11. The sealing agent was cured thereafter.

The thus laminated substrates were placed under vacuum, and a liquid crystal material 16 was injected inside the display region and sealed.

Then, a resin material (a UV-curable resin in this case) was charged in the portion between the substrates under a reduced pressure of from about 0.01 to 10 Torr, and the entire structure was placed under normal pressure or under a pressurized state. The resin material was found to intrude into the periphery of the sealing agent, and the space between the substrates corresponding to the drive circuit region 13 was charged with a resin material 17. The resin was cured thereafter by irradiating an ultraviolet radiation.

In case two substrates of the same size are used, the resin can be mounted on both sides of the substrates. This further facilitates the fabrication process. The liquid crystal material can be injected after charging and curing the resin.

Similar to Example 2, thus was implemented a highly reliable liquid crystal display device having sufficiently high resistance against moisture. The resulting device is illustrated in FIG. 5 (B).

EXAMPLE 4

Figure 6A:
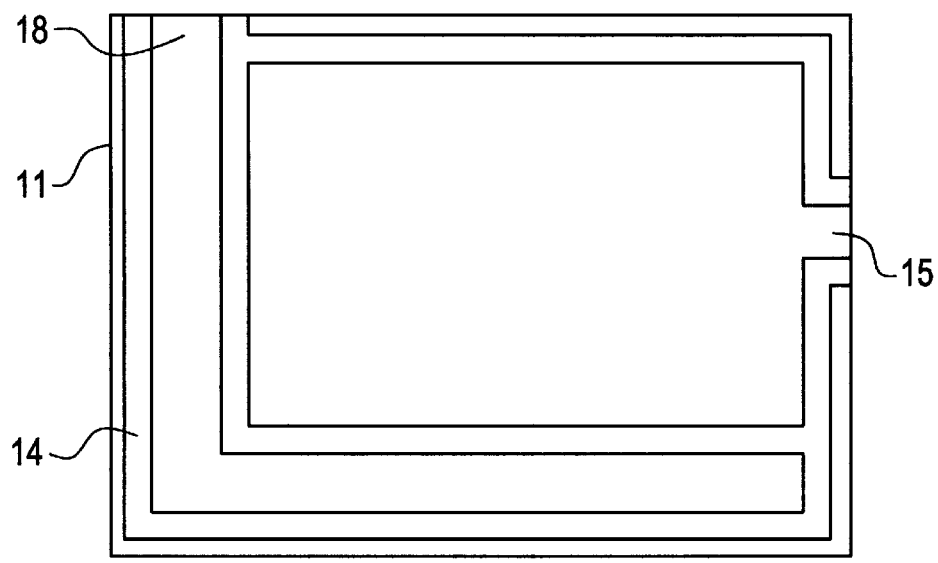
FIGS. 6a–6c show a schematic view of a liquid crystal display device according to a further other embodiment of the present invention.
Figure 6B:
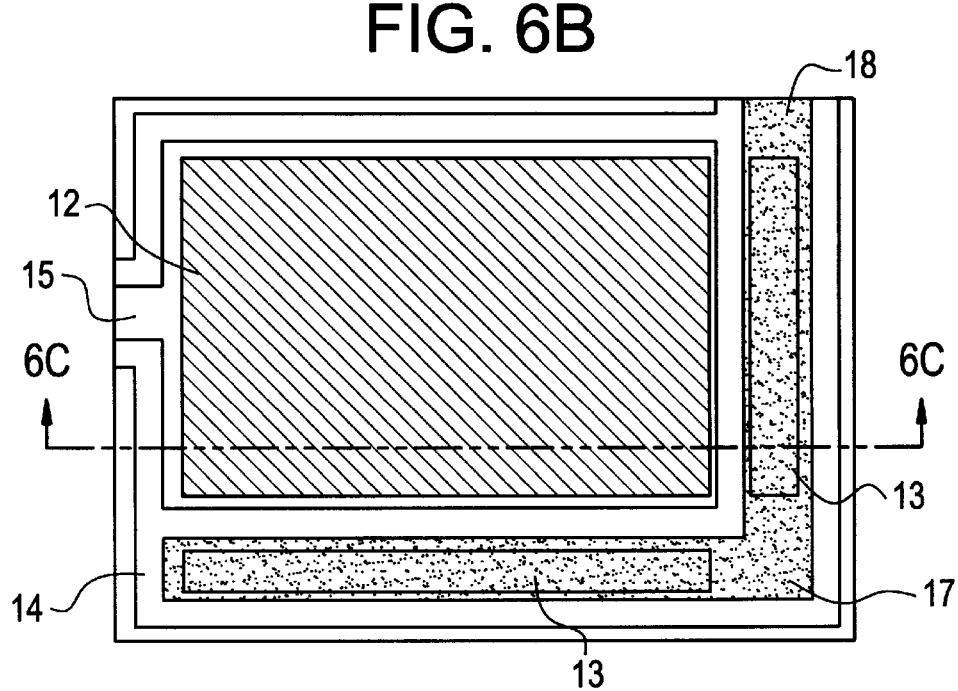
Figure 6C:
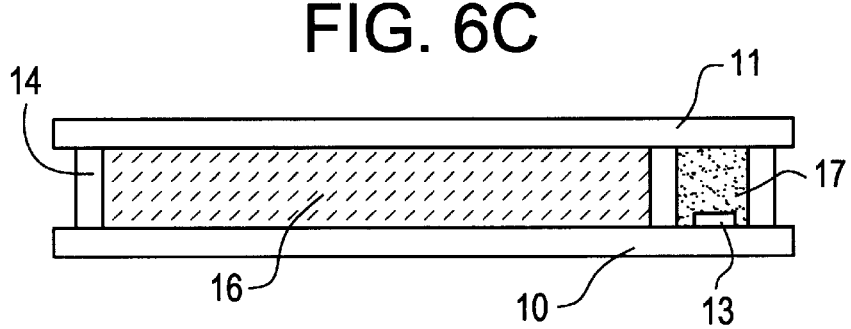

Referring to FIG. 6 (A), a first substrate 10 having thereon a display region and a drive circuit region as well as a second substrate 11 having thereon a facing electrode were fabricated in the same manner as in Example 1. Then, a sealing agent 14, more specifically, a UV-curable resin in this case, was applied by screen printing to the second substrate 11 to form an inlet 15 for injecting a liquid crystal material and an inlet 18 for injecting a resin. The sealing agent may contain spacers.

After scattering spacers on the display region of the first substrate 10, the first substrate 10 was laminated with the second substrate 11. The sealing agent was cured thereafter.

The entire laminated substrates were placed under a reduced pressure of from about 0.01 to 10 Torr, and a liquid crystal material 16 and a resin material 17 (a UV-curable resin in this case) were injected from the inlets 15 and 18, respectively. In this manner, the display region and the region surrounding the drive circuit can be charged with the liquid crystal material 16 and the resin material 17, respectively. The injection can be effected simultaneously; otherwise, it can be effected separately to prevent mixing of the resin material and the liquid crystal from occurring due to evaporation during the injection.

The resulting structure was then placed under a normal pressure or a pressurized state. The resin material 17 was found to intrude into the region covered by the sealing agent to fill the space between the substrates corresponding to the drive circuit region. An ultraviolet radiation was irradiated thereafter to cure the resin.

Similar to Examples 2 and 3, thus was implemented by an extremely simple process, a highly reliable liquid crystal display device having sufficiently high resistance against moisture. The resulting device is illustrated in FIG. 6 (B).

In the aforementioned embodiments, the drive circuit need not to be provided on only one substrate, but it may be fabricated on both of the substrates. The electrical connection between the drive circuits in such a case can be established by using, for example, a silver paste or an electrically conductive spacer. The liquid crystal material may be of any type, inclusive of nematic and smectic liquid crystal materials. In the attached drawings, the first and the second substrates 10 and 11 are drawn in the same size. However, the size of the substrates can be changed as desired as long as a substrate is opposed to the drive circuit provided on the other substrate. Electrodes can be more easily connected by increasing the size of the substrate 10.

In the examples above, special reference was made to active matrix-addressed devices using thin film transistors for the display region. However, the present invention is also applicable to device using non-linear devices such as MIM diodes as well as to simple matrix-addressed devices using simple matrix electrodes.

As described in the foregoing, the present invention provides a liquid crystal display device comprising both a display region and a drive circuit region on a single substrate, in which the drive circuit region is protected against external forces and the like. Furthermore, in case of chamfering a plurality of liquid crystal display panels from a large area substrate by applying a scriber to the laminated substrates, the drive circuit could be protected against the impact and the like which is caused by the operation of a scriber. Thus, the present invention enables production of liquid crystal display panels with high production yield.

Furthermore, in the liquid crystal display device according to the present invention, a resin material was charged between the drive circuit region and the substrate opposed thereto. In this manner, a highly reliable device was implemented by preventing the intrusion of moisture.

In the liquid crystal display device according to the present invention, another drive circuit and the like can be further provided on the region of the second substrate opposed to the drive circuit region. In this manner, a multilayer-structured device having a large drive circuit area can be implemented without increasing the substrate area.

While the invention has been described in detail and with reference to specific embodiments thereof, it will be apparent to one skilled in the art that various changes and modifications can be made therein without departing from the spirit and scope thereof.

What is claimed is:

1. A method of manufacturing a liquid crystal device comprising:
    preparing a first substrate having a driving circuit area and a display area;
    forming first thin film transistors on said display area to constitute an active matrix circuit;
    forming second thin film transistors on said driving circuit area to constitute a first driving circuit;
    applying a sealing member on the first substrate;
    mating a second substrate having a second driving circuit to said first substrate with said sealing member therebetween wherein said second substrate covers both said active matrix circuit and said first driving circuit; and
    cutting said first and second substrates simultaneously to constitute at least one liquid crystal cell,
    wherein said second driving circuit is electrically connected to said first driving circuit,
    wherein said first substrate of said liquid crystal cell after the cutting has at least one side plane which is substantially aligned with a side plane of said second substrate.

2. A method of manufacturing a liquid crystal device according to claim 1 wherein said sealing member is cured by UV light.

3. A method of manufacturing a liquid crystal device according to claim 1 wherein said second thin film transistors are crystalline transistors.

4. A method of manufacturing a liquid crystal device comprising:
    preparing a first substrate having a driving circuit area and a display area;
    forming first thin film transistors on said display area to constitute an active matrix circuit;

forming second thin film transistors on said driving circuit area to constitute a first driving circuit;

applying a sealing member on the first substrate;

mating a second substrate having a second driving circuit to said first substrate with said sealing member therebetween wherein said second substrate covers both said active matrix circuit and said first driving circuit; and cutting said first and second substrates simultaneously to constitute at least one liquid crystal cell, wherein said second driving circuit is electrically connected to said first driving circuit, wherein said second thin film transistors are crystalline transistors obtained by laser irradiation.

5. A method of manufacturing a liquid crystal device according to claim 4 wherein said sealing member is cured by UV light.

6. A method of manufacturing a liquid crystal device comprising:

preparing a first substrate having a driving circuit area and a display area;

forming first thin film transistors on said display area to constitute an active matrix circuit;

forming second thin film transistors on said driving circuit area to constitute a first driving circuit;

applying a sealing member on the first substrate;

mating a second substrate having a second driving circuit to said first substrate with said sealing member therebetween wherein said second substrate covers both said active matrix circuit and said first driving circuit; and disposing a resin between said first driving circuit and said second substrate; and cutting said first and second substrates simultaneously to constitute at least one liquid crystal cell, wherein said second driving circuit is electrically connected to said first driving circuit.

7. A method of manufacturing a liquid crystal device according to claim 6 wherein said sealing member is cured by UV light.

8. A method of manufacturing a liquid crystal device according to claim 6 wherein said second thin film transistors are crystalline transistors.

9. A method of manufacturing a liquid crystal device comprising:

preparing a first substrate having a driving circuit area and a display area;

forming first thin film transistors on said display area to constitute an active matrix circuit;

forming second thin film transistors on said driving circuit area to constitute a first driving circuit, said second thin film transistors are crystalline transistors obtained by laser irradiation;

forming a passivation film on said second thin film transistors;

applying a sealing member on the first substrate;

mating a second substrate having a second driving circuit to said first substrate with said sealing member therebetween wherein said second substrate covers both said active matrix circuit and said first driving circuit; and cutting said first and second substrates simultaneously to constitute at least one liquid crystal cell, wherein said second driving circuit is electrically connected to said first driving circuit, wherein said passivation film is covered with an organic resin.

10. A method of manufacturing a liquid crystal device according to claim 9 wherein said passivation film comprises a material selected from the group consisting of silicon nitride, silicon oxide, PSG, BSG and polyimide.

11. A method of manufacturing a liquid crystal device comprising:

preparing a first substrate having a driving circuit area and a display area;

forming first thin film transistors on said display area to constitute an active matrix circuit;

forming second thin film transistors on said driving circuit area to constitute a first driving circuit, said second thin film transistors are crystalline transistors obtained by laser irradiation;

forming a passivation film on said second thin film transistors;

applying a sealing member on the first substrate;

mating a second substrate having a second driving circuit to said first substrate with said sealing member therebetween wherein said second substrate covers both said active matrix circuit and said first driving circuit; and cutting said first and second substrates simultaneously to constitute at least one liquid crystal cell, wherein said second driving circuit is electrically connected to said first driving circuit, wherein said passivation film is covered with an organic resin, wherein a material of said organic resin is same as said sealing member.

12. A method of manufacturing a liquid crystal device according to claim 11 wherein said passivation film comprises a material selected from the group consisting of silicon nitride, silicon oxide, PSG, BSG and polyimide.

* * * * *